United States Patent [19]

Bauer et al.

[11] Patent Number: 5,352,019
[45] Date of Patent: Oct. 4, 1994

[54] MOTOR VEHICLE SEAT MOVABLE IN THE LONGITUDINAL DIRECTION IN THE TIPPED STATE

[75] Inventors: Heinz Bauer; Burckhard Becker; Ernst-Reinhard Frohnhaus, all of Solingen, Fed. Rep. of Germany

[73] Assignee: Firma C. Rob. Hammerstein GmbH, Fed. Rep. of Germany

[21] Appl. No.: 79,485

[22] Filed: Jun. 18, 1993

[51] Int. Cl.$^5$ .............................................. A47C 1/02
[52] U.S. Cl. ................................................... 297/341
[58] Field of Search .............. 297/341, 344.1, 378.1, 297/378.12

[56] References Cited

U.S. PATENT DOCUMENTS

| | | | |
|---|---|---|---|
| 4,065,178 | 12/1977 | Carella et al. | 297/341 |
| 4,569,557 | 2/1986 | Goforth | 297/341 |
| 4,639,038 | 1/1987 | Heling | 297/341 |
| 4,648,657 | 3/1987 | Cox et al. | 297/341 |
| 4,652,052 | 3/1987 | Hessler et al. | 297/341 |
| 4,671,571 | 6/1987 | Gionet | 297/341 |
| 4,707,030 | 11/1987 | Harding | 297/341 |
| 4,881,774 | 11/1989 | Bradley et al. | 297/341 |
| 5,020,853 | 6/1991 | Babbs | 297/341 |
| 5,137,331 | 8/1992 | Colozza | 297/341 |

FOREIGN PATENT DOCUMENTS

| | | |
|---|---|---|
| 2813534 | 10/1979 | Fed. Rep. of Germany . |
| 3036559 | 4/1982 | Fed. Rep. of Germany . |
| 3608827 | 10/1987 | Fed. Rep. of Germany . |
| 26335 | 2/1984 | Japan ................................ 297/341 |
| 31838 | 2/1988 | Japan ................................ 297/341 |
| 2033738 | 5/1980 | United Kingdom ............... 297/341 |

Primary Examiner—Jose V. Chen
Attorney, Agent, or Firm—Quarles & Brady

[57] ABSTRACT

A motor vehicle seat includes a longitudinal guide with a locking mechanism with a release device for locking and unlocking the locking mechanism in an engaged and in an unengaged position to allow movement of the seat. The backrest can be tipped forward and is connected to the locking mechanism. The locking mechanism unlocks when the backrest is tipped forward and for allowing manual movement of the motor vehicle seat in a longitudinal direction. A memory device serves to find the previously engaged position of the locking mechanism.

20 Claims, 1 Drawing Sheet

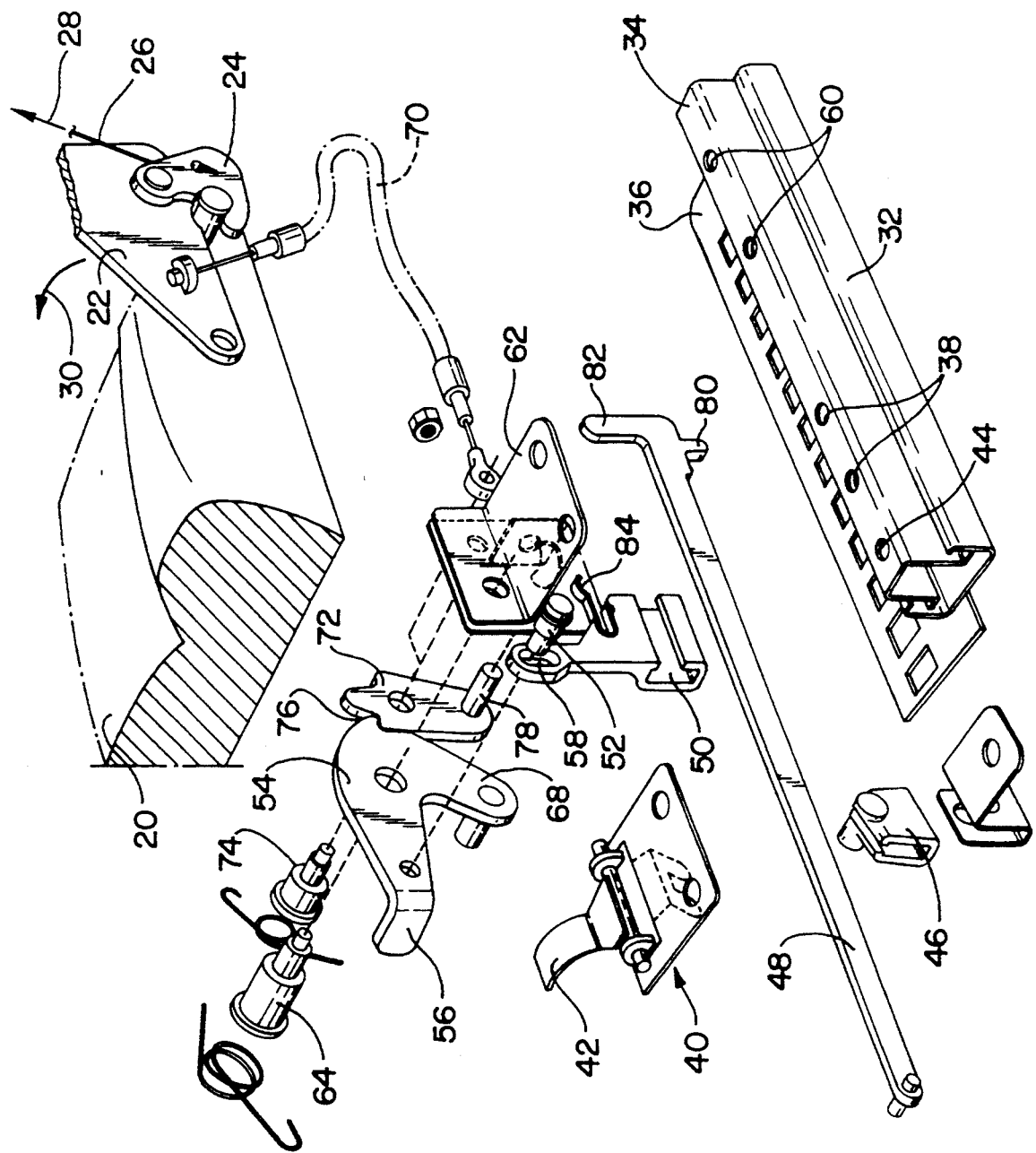

MOTOR VEHICLE SEAT MOVABLE IN THE LONGITUDINAL DIRECTION IN THE TIPPED STATE

BACKGROUND OF THE INVENTION

The invention relates to a motor vehicle seat with a) a longitudinal guide that can be locked, with b) a backrest that can be tipped forward and which is connected to the locking mechanism of the longitudinal guide by means of a release device so that, when the backrest is tipped forward, the locking mechanism of the longitudinal guide is released and the motor vehicle seat can be moved manually in the longitudinal direction, and with c) a memory device for again finding the previously engaged position of the locking mechanism following such a longitudinal movement. The longitudinal guide, in addition to the locking mechanism, also features a floor track, a seat track that is guided therein and with which the locking mechanism is connected, and featuring a notched bar that is arranged on the floor track. The memory device has a drag lever that is fixed in the seat track so as to be longitudinally movable and tiltable, and features a memory pin that engages in the notches of the notched bar. The release device has an unlocking lever that pivots around a bearing shaft connected to the seat rail, and a release arm that acts in conjunction with the locking mechanism and is connected to the backrest in a movement dependent manner.

In particular, in two door passenger cars with rear seats a problem exists in that access to the rear seats is limited by the front seats. For the motor vehicle seat indicated above and known previously from the DE-OS 36 08 827, a forced interlocking mechanism is provided which, if the backrest is tilted forward, causes a longitudinal movement of the seat in its longitudinal guide. For this purpose a control lever that points downward and is constantly engaged with the drag lever is connected to the backrest. In addition to that, a release lever is also provided which provides assurance that the locking mechanism releases only when the memory pin engages a notch. The unlocking lever extends below the hand lever of the locking mechanism and lifts the latter into the release position after the memory pin has engaged, and the backrest is tilted farther forward.

Moreover, a motor vehicle seat is known from DE-OS 30 36 559, whereby a toothed segment is formed at the lower end of the control lever that is connected to the backrest, said segment acting together with a notched bar connected to the vehicle chassis. When the backrest is not tilted back the teeth of this toothed segment are normally not engaged with the holes of the notched bar. Upon the initiation of the tilting of the backrest, however, the toothed segments first engage and then roll forward during further tilting.

In the case of the vehicle seat known from DE-OS 28 13 534 the backrest is tilted forward after releasing a blocking mechanism that acts together with a seat frame, thereby the seat part is carried along and moved forward via connecting rods.

The advantage of the motor vehicle seat according to DE-OS 36 08 827 is that the same notched bar is used for locking and for the memory pin. The disadvantage of this known solution, however, is that it is difficult to adapt it to already existing designs of normal vehicle seats which cannot be moved forward by tilting the backrest. But it is this very point which the vehicle manufacturers are interested in, that is, the normal design of motor vehicle seats should be utilized to the extent possible and vehicle seats of the type mentioned above should be enhanced such that a small number of accessory parts provides the additional function of free forward movement after tilting the backrest.

SUMMARY OF THE INVENTION

Accordingly, the task of the invention is to further develop the motor vehicle seat of the above mentioned type in such a way that the seat can move after the backrest is tilted forward and that this can be applied to a seat design of a normal embodiment, and that this can be accomplished with as few individual elements as possible.

This task is accomplished with the motor vehicle seat of the above mentioned type in that a drag lever is held in a longitudinally movable manner in a guiding part, swivelably supported at the unlocking lever at some distance from the bearing shaft and forming a stop, and that a blocking lever is provided which i) is swivelably supported around a lever axle that is connected to a seat track at some distance from the bearing shaft, the lever axle ii) featuring a recess that holds the unlocking lever in the blocking position of the blocking lever in a form-locking manner in a non-locked swivel position, and the lever iii) featuring a counterstop for the stop, so that when the stop and the counterstop meet, the blocking lever swivels out of the blocking position and the unlocking lever is released.

With this embodiment a normal motor vehicle seat, such as is provided, for example, on four door vehicles, can be further developed with few additional parts, so that it can also be used for two door motor vehicles. The two designs are not substantially different in this case. More particularly, the invention does not involve any structural preconditions which are not already normally fulfilled by a motor vehicle seat in a four door motor vehicle.

In contrast to the motor vehicle seat of the type initially mentioned, only simple measures need to be implemented on the backrest in order to be able to transfer its pivoting motion to the unlocking lever. The necessary measures for this purpose can be implemented on a hinged fitting with essentially no extra cost.

It is also particularly advantageous if the unlocking lever, with its unlocking arm, acts directly on the locking mechanism without the necessity of lifting a hand lever for the manual actuation of the locking mechanism. This then prevents inadvertent blocking of the hand lever, for example by an object, by which the function of the motor vehicle seat would be impaired.

Insofar as space is concerned, the additional components, by means of which a normal seat can be retrofitted into a movable seat by tilting the backrest, requires little space. Also, in so far as weight is concerned, the additional components play a subordinate role. The entire accessory device, also referred to as a mechanical memory device, needs only be constructed on one pair of tracks of a longitudinal adjustment device.

The unlocking lever may be part of a locking mechanism, but it may also be a separate part that acts in conjunction with a triggering lever of the locking mechanism. In both cases the manual activation of the locking mechanism can act directly on the unlocking lever. But in this case the blocking lever must also be released through manual actuation, if the unlocking lever is kept in its release position by the blocking lever. For this purpose, the blocking lever is connected to the manual actuator of the locking mechanism by means of a drag device.

It has been proven to be very advantageous to design the device according to the invention in such a way that, as the backrest begins to tilt forward, the memory pin initially engages in a notch of the notched bar, before the locking mechanism is released by means of the unlocking lever. In this case the memory pin cannot assume a position between two notches.

In a type of construction where the unlocking of the locking mechanism can take place before the memory pin has engaged, spring loading the memory pin guarantees that the memory pin will engage as soon as a relative movement between the tracks of the longitudinal guide takes place. For this reason the drag lever is spring loaded in the direction of engagement of the memory pin, for example by a spring which preloads the guiding part downward in the direction of engagement of the pin. The pin thus engages at the latest during a relative movement of the vehicle seat with respect to the floor group of the vehicle. Such embodiments are self evident, for example, from stepless locking, in which case an individual, notched bar must be provided for the memory pin.

BRIEF DESCRIPTION OF THE DRAWINGS

Further advantages and characteristics of the invention result from the other claims, as well as from the following description of an exemplified embodiment of the invention, which is explained in further detail in the drawing. This drawing, with its sole FIGURE, shows:

an assembly drawing of the essential parts of a vehicle seat, insofar as necessary for the explanation of the invention.

DETAILED DESCRIPTION OF THE PREFERRED EMBODIMENTS

A part of a seat 20 of a motor vehicle seat is shown in the FIGURE, on which a backrest (not shown) is arranged by means of a hinge fitting 22. A latch 24 which is underneath an associated pin holds the backrest in its normal position. However, if the latch 24 is swung out by means of a cable 26 in the direction of the arrow 28, the backrest can be folded forward in the direction of the arrow 30.

The part of the seat 20 is connected, in a known manner, to a floor group of the vehicle (not shown) by means of a longitudinal guide. Only one pair of tracks of the longitudinal guide is shown, consisting of a floor track 32 and a seat track 34. A notched bar 36 is connected to the floor track 32. Two holes 38 are provided in the seat track 34 for mounting a locking mechanism 40. The mechanism 40 features a swivelably supported locking lever 42 which progresses into two blocking teeth at its lower end that can engage in adjacent notches of the notched bar 36.

Furthermore, the seat track 34 has a hole 44 for fastening a supporting latch at its one end area, and in said hole a retaining part 46 is arranged in an articulated manner. In the assembled condition it embraces a drag lever 48, the overall length of which approximates the length of the track. The drag lever 48 can be moved longitudinally by means of the retaining part 46, but is also fixed at the seat track 34 so as to tilt within a minor angle (less than 5°). In order to prevent the drag lever 48 from slipping out of the retainer part 46, both end areas feature a shape related expansion. This will be discussed later.

Moreover, the drag lever 48 is retained by a guiding part 50. It embraces the drag lever 48, as does the retaining part 46, at the area of constant cross section. The guiding part 50 is arranged on an unlocking lever 54 in an articulated manner by means of a supporting pin 52 and, that is, on an unlocking arm 56 of the unlocking lever 54. The supporting pin 52 thereby passes through a longitudinal hole 58 in the guiding part 50, whereby a drag connection results.

In two holes 60 at the other end area of the seat track 34 a bearing block 62 is fastened, on which most of the parts which will be discussed in the following are arranged. In particular, this bearing block 62 features a bore hole that accepts a bearing shaft 64 on which the unlocking lever 54 is swivelably supported. The unlocking lever 54 lies on the locking lever 42 with the free end of its unlocking arm 56. The unlocking lever 54 features a second arm, the activating arm 68. One end of a Bowden cable 70 acts on the activating arm 68, said Bowden cable 70, according to the drawing, being longitudinally adjustable. The other end is attached to the hinge fitting 22.

By swinging the hinge fitting 22 forward in the direction of the arrow 30 a torque is exerted on the unlocking lever 54, whereby its unlocking arm 56 is pushed downward, as is shown in the drawing. In this state, in an assembled device, the locking lever 42 is pushed down, whereby the locking teeth associated with it are freed from the notched bar 36.

Additionally, a blocking lever 72 is swivelably supported on the bearing block 62, in particular around a lever axle 74. Unlocking lever 54 and blocking lever 72 are both located on the same plane. The blocking lever 72 features a recess 76 in the shape of a shoulder, and the associated, adjacent area of the unlocking lever 54 is shaped accordingly. In the embodiment shown, the recess 76 is force-locked in position on the unlocking lever 54. This position of the blocking lever 72 is referred to as the blocking position. Unlocking lever 54 and blocking lever 72 are each preloaded by a spring surrounding the shafts 64 and 74, in a position which assures the discussed and illustrated position of the two levers 54 and 72, that is, acting on both of them and oppositely directed.

A stop 78 in the form of a pin is featured on the blocking lever 72, said pin being located opposite the recess 76 with respect to the lever axle 74. This pin-shaped stop 78 passes through a curved, oblong hole in the bearing block 62 and protrudes into the movement range of the drag lever 48. This drag lever 48, at its depicted, right end area, features a memory pin 80 that faces downward, which will be dealt with later, and one facing in the opposite direction, that is, a counterstop 82 protruding upward. If, in the case of a seat adjustment, the stop 78 and the counterstop 82 meet each other, the blocking lever 72 pivots out of the blocking position as shown, whereby its recess 76 no longer fixes the blocking lever 72. The latter can therefore swivel upward, whereby it releases the locking lever 42. This leads to a mutual locking of the two tracks 32 and 34.

With the backrest tilted forward, that is, the hinge fitting 22 is swiveled, and a subsequent forward movement of the seat part 20, the following actions will occur: As a result of swiveling the hinge fitting 22 upward, the Bowden cable 70 acting on the actuating arm 68 becomes subject to tension and leads to pivoting of the unlocking lever 54. The blocking lever 72, which is elastically preloaded in the rotational direction, follows, until its recess 76 can engage in the corresponding recess of the unlocking lever 54. This position is shown in the drawing.

During its pivoting movement the unlocking lever 54, with its unlocking arm 56, pushes down the locking lever 42 of the locking device 40. The previously engaged teeth are thereby pivoted from the notches of the notched bar 36. The locked state is released.

Furthermore, through the pivoting movement of the unlocking lever 54, the bearing pin 52, which holds the guiding part 50, has also been pushed downward. Therefore, the guiding part 50, which is acted upon by a spring 84 and which is supported on the bottom of the bearing block 62, can carry out a downward movement. In so doing, it takes along the drag lever 48 and pushes the memory pin 80 of the latter into a notch of the notched bar 36.

If there is no notch under the memory pin 80, but instead an area between two notches, the memory pin 80 cannot engage in a notch. A subsequent, relative movement between the two tracks 32, 34, however, leads to the memory pin 80 engaging automatically by means of the spring 84.

In the position thus reached, which also corresponds to the drawing, the seat part 20 can be moved freely in the longitudinal direction.

If the vehicle seat is to assume the normally used position the backrest is tilted back, that is, the hinge fitting 22 again swings into the normal position in the opposite direction of arrow 30. In this case it is assumed that the seat part 20 is not yet moved back completely. If it is now moved back completely, for example during a tilt of the backrest or later by an occupant, the stop 78 reaches the counterstop 82, whereby the blocking lever 72 is pivoted from its blocking position as described. This, in turn, leads to the release of the unlocking lever 54, which can pivot upward after the tension on the Bowden cable 70 is eliminated. As a result of this, the drag lever 48 is lifted by means of the guiding part 50 so that the memory pin is pulled out of the notched bar, on the other hand the locking lever 42 is no longer under load, so that the teeth can again engage in those notches in which they were engaged prior to the described movement.

We claim:

1. A motor vehicle seat comprising: a) a longitudinal guide having a locking mechanism (40) that can be locked in an engaged position, said locking mechanism (40) having a release device for unlocking said locking mechanism (40) from said engaged position: b) a backrest that can be tipped forward connected to the locking mechanism (40) of the longitudinal guide through the release device for unlocking the locking mechanism (40) when the backrest is tipped forward, and for allowing manual movement of the motor vehicle seat in a longitudinal direction, and c) a memory device for finding the previously engaged position of the locking mechanism (40) following a manual longitudinal movement, wherein:

the longitudinal guide further comprises, a floor track (32), a seat track (34) that is guided by said floor track (32), and to which the locking mechanism (40) is connected, a notched bar (36) having notches, and arranged on the floor track (32);

the memory device has a drag lever (48) fixed at the seat track (34) in a longitudinally movable and swivelable manner, and a memory pin (80) that engaged the notches of the notch bar (36);

the release device including an unlocking lever (54) having an unlocking arm (56) that acts in conjunction with the locking mechanism (40), the unlocking lever (54) being swivelably supported around a bearing axle (64) connected to the seat track (34), and connected to the backrest in a movement dependent manner, characterized by:

the drag lever (48) being held in a guiding part (50) in a longitudinally movable manner, and swivelably attached to the unlocking lever (54) at a distance from the bearing shaft (64), and having a counterstop (82); and a blocking lever 72 which is i) swivelably supported around a lever axle (74) which is connected to a seat track (34) at a distance from the bearing axle (64), said blocking lever (72), ii) having a recess (76) for holding the unlocking lever (54) in a blocking position, and said blocking lever (72), iii) featuring a stop (78) for the counterstop (82), for having the stop (78) and the counterstop (82) meet, when the blocking lever (72) swivels out of the blocking position and the unlocking lever (54) is released.

2. A motor vehicle seat according to claim 1, configured for having the release of the locking mechanism (40) by means of the unlocking arm (56) of the unlocking lever (54) lag mechanically behind the engagement of the memory pin (80) in a notch of the notched bar (36).

3. A motor vehicle seat according to claim 2, further comprising drag connection means associated with the blocking lever (72) for, during an adjustment of seat position through manual actuation for release of locking mechanism (40), pulling the block lever (72) from its blocking position, in the event that it is in the blocking position.

4. A motor vehicle seat according to claim 2, further comprising a bearing block (62) fastened to the seat track (34) for supporting the bearing shaft (64) and the lever axle (74).

5. A motor vehicle seat according to claim 1, further comprising drag connection means associated with the blocking lever (72) for, during an adjustment of seat position through manual actuation for release of locking mechanism (40), pulling the block lever (72) from its blocking position, in the event that it is in the blocking position.

6. A motor vehicle seat according to claim 5, further comprising a bearing block (62) fastened to the seat track (34) for supporting the bearing shaft (64) and the lever axle (74).

7. A motor vehicle seat according to claim 1, further comprising a bearing block (62) fastened to the seat track (34) for supporting the bearing shaft (64) and the lever axle (74).

8. A motor vehicle seat according to claim 4, wherein the stop (78) of the blocking lever (72) comprises a bolt that extends parallel to the lever axle (74) and passes through a curved, oblong hole in the bearing block (62).

9. A motor vehicle seat according to claim 1, further comprising a hinge fitting (22) of the backrest connected to the unlocking lever (54) by means of a Bowden cable (70).

10. A motor vehicle seat according to claim 1, wherein the bearing axle (64) and the lever axle (74) extend parallel to each other.

11. A motor vehicle seat according to claim 1, further comprising a drag guide connecting the unlocking lever (54) with the drag lever (48) through one elongated hole provided in guiding part (50), the drag path of which corresponds to the engagement path of the memory pin (80), and wherein the memory pin (80) is elastically preloaded in the direction of the notched bar (36) by means of a spring.

12. A motor vehicle seat comprising: a) a longitudinal guide having a locking mechanism (40) that can be locked in an engaged position, said locking mechanism (40) having a release device for unlocking said locking mechanism from said engaged position, b) a backrest configured for being tipped forward and connected to the locking mechanism (40) through the release device for unlocking the locking mechanism (40) when the backrest is tipped forward and for allowing manual movement of the motor vehicle seat in a longitudinal direction, and c) a memory device for finding the previously engaged position of the locking mechanism (40) following such manual movement upon return of the backrest to a non-tipped position, wherein;

the longitudinal guide further comprises a floor track (32), a seat track (34) guided by said floor track (32), with said locking mechanism (40) connected to said seat track (34), a notched bar (36) having notches and arranged on said floor track (32) for locking said seat through its seat track (34) in a fixed position through engagement between one of its notches and said locking mechanism (40);

the memory device comprising a drag lever (48) attached to said seat track (34) in both a longitudinally movable and a tiltable manner, and a memory pin (80) for engaging the notches of notch bar (36);

said release device comprising an unlocking lever (54) with an unlocking arm (56) for operating with said locking mechanism (40) for causing locking and unlocking thereof, said unlocking lever (54) being supported for motion about a bearing axle (64) which is connected to the seat track (34), and said unlocking fever (54) being connected to the backrest for pivoting movement thereof about said bearing axle (64) upon tilting movement of the backrest; and said motor vehicle seat further characterized by:

said drag lever (48) being held in a guiding part (50) for longitudinal movement thereof along the guiding part (40), and tiltably attached to said unlocking lever (54) at a distance from the bearing shaft (64), and said drag lever (48) having a counterstop (82); and a blocking lever (72) which i) is supported for movement about a lever axle (74), said lever axle (74) being connected to said seat track (34) at a distance from the bearing axle (64), ii) has a recess (76) for holding the unlocking lever (54) in a blocking position for unlocking locking mechanism (40), and iii) has a stop (78) for meeting said counterstop (82) when said blocking lever (72) moves about said lever axle (74) to permit the unlocking lever (54) to move from the blocking position.

13. A motor vehicle seat according to claim 12 wherein said unlocking arm (54) is connected with respect to said memory pin (80) to lag behind the engagement of memory pin (80) in a notch of notched bar (36) when operated to release locking mechanism (40).

14. A motor vehicle seat according to claim 12 further comprising drag connection means associated with the blocking lever (72) for pulling the blocking lever (72) from its blocking position to permit manual release of locking mechanism (40) during manual adjustment of seat position.

15. A motor vehicle seat according to claim 12, further comprising a bearing block (62) fastened to the seat track (34) for supporting the bearing shaft (64) and the lever axle (74).

16. A motor vehicle seat according to claim 12, wherein the stop (78) of the blocking lever (72) comprises a bolt that extends parallel to the lever axle (74) and passes through a curved, oblong hole in the bearing block (62).

17. A motor vehicle seat according to claim 12, further comprising a hinge fitting (22) of the backrest connected to the unlocking lever (54) by means of a Bowden cable (70).

18. A motor vehicle seat according to claim 12, wherein the bearing axle (64) and the lever axle (74) extend parallel to each other.

19. A motor vehicle seat according to claim 12, further comprising a drag guide connecting the unlocking lever (54) with the drag lever (48) through one elongated hole provided in guiding part (50), the drag path of which corresponds to the engagement path of the memory pin (80), and wherein the memory pin (80) is elastically preloaded in the direction of the notched bar (36) by means of a spring.

20. A motor vehicle seat comprising: a) a longitudinal guide having a locking mechanism (40) that can be locked in an engaged position, said locking mechanism having a release device for unlocking said locking mechanism (40) from said engaged position, b) a backrest configured for being tipped forward and connected to the locking mechanism (40) through the release device for unlocking the locking mechanism (40) when the backrest is tipped forward and for allowing manual movement off the motor vehicle seat in a longitudinal direction, and c) a memory device for finding the previously engaged position of the locking mechanism (40) following such manual movement upon return of the backrest to a non-tipped position, wherein;

the longitudinal guide further comprises a floor track (32), a seat track (34) guided by said floor track (32), with said locking mechanism (40) connected to said seat track (34), a notched bar (36) having notches and arranged on said floor track (32) for locking said seat through its seat track (34) in a fixed position through engagement between one of its notches and said locking mechanism (40);

the memory device comprising a drag lever (48) attached to said seat track (34) in both a longitudinally movable and a tiltable manner, and a memory pin (80) for engaging the notches of notch bar (36);

said release device comprising an unlocking lever (54) with an unlocking arm (56) for operating with said locking mechanism (40) for causing locking and unlocking thereof, said unlocking lever (54) being supported for motion about a bearing axle (64) which is connected to the seat track (34), and said unlocking lever (54) being connected to the backrest for pivoting movement thereof about said bearing axle (64) upon tilting movement of the backrest, and said unlocking arm (54) is connected with respect to said memory pin (80) to lag behind the engagement of memory pin (80) in a notch of notched bar (36) when operated to release locking mechanism (40); and said motor vehicle seat further characterized by:

said drag lever (48) being held in a guiding part (50) for longitudinal movement thereof along the guiding part (40), and tiltably attached to said unlocking lever (54) at a distance from the bearing shaft (64), and said drag lever (48) having a counterstop (82);

a blocking lever (72) which i) is supported for movement about a lever axle (74), said lever axle (74) being connected to said seat track (34) at a distance from the bearing axle (64), ii) has a recess (76) for holding the unlocking lever (54) in a blocking position for unlocking locking mechanism (40), and iii) has a stop (78) for meeting said counterstop (82) when said blocking lever (72) moves about said lever axle (74) to permit the unlocking lever (54) to move from the blocking position;

drag connection means associated with the blocking lever (72) for pulling the blocking lever (72) from its blocking position to permit manual release of locking mechanism (40) during manual adjustment of seat position;

a bearing block (62) fastened to the seat track (34) for supporting the bearing shaft (64) and lever axle (74); and said stop (78) of the blocking lever (72) comprising a bolt which extends parallel to lever axle (74), and passes through a curved, oblong opening in bearing block (62) for movement therein to contact counterstop (82).

* * * * *

UNITED STATES PATENT AND TRADEMARK OFFICE
CERTIFICATE OF CORRECTION

PATENT NO. : 5,352,019

DATED : October 4, 1994

INVENTOR(S) : Bauer et al.

It is certified that error appears in the above-indentified patent and that said Letters Patent is hereby corrected as shown below:

Column 7, line 41, replace "fever" with --lever--.
Column 8, line 38, replace "off" with --of--.

Signed and Sealed this

Seventh Day of February, 1995

Attest:

BRUCE LEHMAN

Attesting Officer

Commissioner of Patents and Trademarks